United States Patent [19]
Grantham et al.

[11] 3,932,587
[45] Jan. 13, 1976

[54] ABSORPTION OF SULFUR OXIDES FROM FLUE GAS

[75] Inventors: LeRoy F. Grantham, Calabasas; Dennis C. Gehri, Granada Hills; Bruno Katz, Encino, all of Calif.

[73] Assignee: Rockwell International Corporation, El Segundo, Calif.

[22] Filed: Oct. 26, 1972

[21] Appl. No.: 300,925

Related U.S. Application Data

[63] Continuation-in-part of Ser. No. 206,382, Dec. 9, 1971, abandoned.

[52] U.S. Cl. .............. 423/242; 423/422; 423/428; 423/563
[51] Int. Cl.² ......................................... C01B 17/00
[58] Field of Search ........................ 423/242–244, 423/422, 428, 563

[56] References Cited

UNITED STATES PATENTS

| | | | |
|---|---|---|---|
| 1,983,789 | 12/1934 | Bradley | 423/422 |
| 2,231,309 | 2/1941 | Weber | 423/242 |
| 3,438,727 | 4/1969 | Heredy | 423/242 |
| 3,524,720 | 8/1970 | Bauer | 423/244 |

FOREIGN PATENTS OR APPLICATIONS

| | | | |
|---|---|---|---|
| 767,629 | 2/1957 | United Kingdom | 423/422 |

Primary Examiner—Oscar R. Vertiz
Assistant Examiner—Gregory A. Heller
Attorney, Agent, or Firm—L. Lee Humphries; Henry Kolin

[57] ABSTRACT

A method is shown for removing sulfur dioxide from a hot flue gas by absorption of the sulfur dioxide in an aqueous solution or slurry containing no more than 40 wt.% of an alkali metal carbonate or bicarbonate, preferably sodium carbonate and/or sodium bicarbonate using a spray-dryer scrubber to produce a dry mixture of sodium sulfite, sodium sulfate, and sodium carbonate and/or bicarbonate. Such a mixture is directly suitable as a feed to a regeneration stage.

It is particularly preferred to regenerate the absorbent and recover commercial sulfur values in a closed-cycle process by next treating the solid absorption product in a molten salt reduction step with a reducing agent, preferably a carbonaceous material, to reduce the sodium sulfite and sulfate to sodium sulfide. Concurrently, a source of oxygen is fed to the reducer to generate sufficient heat therein for the reduction step by a combustion reaction. In the subsequent aqueous reformation step, the resulting sodium sulfide-carbonate melt from the reduction step is dissolved in water and reacted with carbon dioxide or a carbon dioxide-yielding material to form hydrogen sulfide as a recoverable product for further processing and regenerate the sodium carbonate-bicarbonate absorbent.

7 Claims, 1 Drawing Figure

ABSORPTION OF SULFUR OXIDES FROM FLUE GAS

CROSS REFERENCES TO RELATED APPLICATIONS

This application is a continuation-in-part of application Ser. No. 206,382 filed Dec. 9, 1971, and since abandoned.

BACKGROUND OF THE INVENTION

This invention relates to a process for the removal of sulfur compounds from waste gases. It particularly relates to a closed-cycle process for removing sulfur oxides from a power plant flue gas wherein a first stage of aqueous or solid absorption is followed by a two-stage regeneration process comprising the sequential steps of molten salt reduction and aqueous reformation. At the same time, hydrogen sulfide is formed and recovered as a source of sulfur values. In its preferred aspects, the sulfur dioxide content of a hot flue gas is removed by absorption in an aqueous sodium carbonate-bicarbonate solution or slurry using a spray-dryer scrubber to form a solid absorption product.

Sulfur oxides, principally as sulfur dioxide, are present in the waste gases discharged from many metal refining and chemical plants and in the flue gases from power plants generating electricity by the combustion of fossil fuels. The control of air pollution resulting from the discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3,000 p.p.m. sulfur dioxide and 30 p.p.m. sulfur trioxide by volume, the large volumes of these flue gases relative to the quantity of sulfur which they contain make removal or recovery of the sulfur compounds from these gases expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. Several dry processes have been proposed in which sulfur dioxide is removed either by chemical reaction with a solid absorbent or by adsorption on its surface followed by oxidation of the adsorbed sulfur dioxide. In one such process, shown in U.S. Pat. No. 2,718,453, finely powdered calcium carbonate is blown into the combustion gas to form calcium sulfate or calcium sulfite. In general, a reaction between a solid and gas is relatively slow and inefficient, being limited by the available surface area of the solid. Also, certain of the resultant products do not readily lend themselves to regeneration of the starting material or recovery of the removed sulfur values.

In the molten carbonate process shown in U.S. Pat. Nos. 3,438,722, 3,438,727, and 3,438,728, sulfur oxide impurities are removed from a hot combustion gas by contacting it at a temperature of at least 350°C with a molten salt mixture containing alkali metal carbonates as the active absorbent. The spent absorbent is then regenerated chemically and recirculated. The adaptation of such a process to many older existing powerplant utility installations often presents certain economic disadvantages because of the requirements for modifying the boiler systems of these utility plants in order to obtain the flue gas to be treated at the required elevated temperature for the molten salt absorption rather than at its generally much lower exit temperature from the boiler.

Wet absorption processes are suitable for treating these lower temperature flue gases. In typical wet absorption processes, the flue gas is washed with an aqueous alkaline solution or slurry. Thus the use of an aqueous slurry of calcium hydroxide or calcium carbonate has been investigated in several British power plants. Also, aqueous sodium sulfite or ammonia solutions have been utilized as washing fluids.

In the wet absorption process shown in U.S. Pat. No. 3,533,748, a waste gas stream containing sulfur oxides is scrubbed with an aqueous solution of a soluble alkali such as sodium carbonate or sodium hydroxide to form sulfite and sulfate in solution. The resulting solution is then cooled to precipitate solid alkali metal sulfite and sulfate salts, which are separated from the solution and further processed.

While these wet absorption processes have some advantages, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment, and the general formation of plumes at the point of emission from the power-plant stack, create substantial problems. Also, difficulties arise where economic and efficient recovery of the dissolved absorbent and sulfur values from aqueous solution is attempted. In many such processes, the recovery of elemental sulfur, a preferred product, is not economical.

In U.S. Pat. No. 3,305,307 is shown a process for the manufacture of solid alkali metal sulfite with negligible formation of alkali metal sulfate. A finely dispersed concentrated aqueous solution of an alkali metal compound such as sodium or potassium carbonate, hydroxide, or bicarbonate is passed into a substantially dry gas containing an equivalent or greater amount of sulfur dioxide, the dry gas being maintained at a temperature such that solid alkali metal sulfite is formed. To obtain the pure alkali metal sulfite by such a process, an excess reactant amount of $SO_2$ compared with the alkali metal compound is required. Also, to avoid the formation of alkali metal sulfate, the gas containing the $SO_2$ reactant must be relatively free of sulfur trioxide and oxidation-promoting substances such as nitrogen oxides and metal oxides, the latter being found as fly ash. In addition, a relatively low temperature of reaction is generally required, higher temperatures promoting formation of sulfate.

With respect to the proposed reduction and reformation steps herein, the reduction of sodium sulfate with carbon is generally known, particularly in connection with pulping operations. Illustrative are U.S. Pat. Nos. 1,130,317, 1,609,615, and 3,248,169. Gasification and combustion of carbonaceous materials are shown in U.S. Pat. Nos. 3,533,739 and 3,567,412. U.S. Pat. Nos.

2,344,104 and 2,838,374 also deal with the reduction of sulfites and sulfates. The aqueous reformation step has been generally shown in the art in connection with neutral sulfite semichemical pulping and Kraft processes. Illustrative are U.S. Pat. Nos. 2,163,554, 2,611,682 and 3,496,550.

The present process differs from known processes in providing an improved aqueous absorption process as well as a novel combination of the sequential steps of solid or aqueous absorption, molten salt reduction, and aqueous reformation to provide a closed-cycle process particularly advantageous for treating lower temperature flue gases containing sulfur oxides and for recovering the sulfur values present while regenerating the absorbent.

SUMMARY OF THE INVENTION

It is an object of the present invention to provide a unique wet absorption process for removing sulfur oxides from waste gas streams, including power plant flue gas, which contain sulfur oxides, nitrogen oxides, and fly ash. Such a process avoids the disadvantageous features hitherto characterizing wet absorption processes. It is a further object to integrate this wet absorption process into a novel closed-cycle process wherein the absorbent is regenerated and commercial sulfur values are readily recovered from the formed hydrogen sulfide to provide an economic process of commercial interest, particularly suitable for use with older electric utility plants. This closed-cycle process affords the further advantage of being able to utilize known solid or aqueous absorption processes for the first stage of absorption, and of being able to recover sulfur values from the absorption product whether in the form of alkali metal sulfate or sulfite.

In accordance with the broad aspects of the present invention, a closed-cycle process for removing sulfur oxides from waste gases comprises the combination of sequential steps of (1) solid or aqueous absorption using alkali metal bicarbonate and/or carbonate to form alkali metal sulfite and sulfate, (2) reduction of alkali metal sulfite and sulfate in the molten state with a reducing agent, preferably a carbonaceous material, to form alkali metal sulfide while utilizing oxygen for internal heat generation for the reduction reaction, and (3) dissolution of the alkali metal sulfide in water and aqueous reformation of the alkali metal sulfide to regenerate the alkali metal carbonate or bicarbonate and form hydrogen sulfide from which commercial sulfur values are obtainable.

It is a preferred feature of the present invention to provide an improved wet absorption process for removing more than 90% of the sulfur oxides present, a dry reaction product being obtained, by treating the sulfur-containing waste gas, suitably a power-plant flue gas, with an aqueous scrubbing medium consisting of a solution or slurry containing no more than 40 wt.% of alkali metal carbonate and/or bicarbonate. This solution or slurry may be at any suitable temperature below its boiling point. Where sodium carbonate is used as absorbent, a range of 2 to 40 wt.% of sodium carbonate in the aqueous scrubbing medium is suitable. It is particularly preferred to use a relatively dilute aqueous solution of sodium carbonate. When sodium bicarbonate is used as absorbent, a range of 2 to 20 wt.% sodium bicarbonate in the aqueous scrubbing medium is suitable. The concentration of the preferred scrubbing medium depends on the amount of $SO_2$ in the waste gas to be contacted and also on the temperature of the gas. To maximize absorbent utilization and $SO_2$ removal efficiency, the solution should be as dilute as possible consistent with obtaining a dry product. Thus to remove 90% of the 400 p.p.m. of $SO_2$ present in a flue gas at a temperature of 150°C, a preferred aqueous sodium carbonate concentration between 3 and 4 wt.% is utilized. At a given temperature, for equivalent removal of higher $SO_2$ concentrations present in the waste gas, higher concentrations of aqueous $Na_2CO_3$ are required. Thus for treatment of a power-plant flue gas at a temperature of 150°C containing 4,000 p.p.m. sulfur oxides, a 40 wt.% aqueous slurry of sodium carbonate is utilized.

To achieve at least 90% removal of $SO_2$ from the waste gas in a single pass, the sodium carbonate and/or bicarbonate should be in stoichiometric excess, preferably from about 1.1:1 to 1.5:1. While stoichiometric ratios up to about 5:1 are suitable and will remove substantially all of the sulfur oxides in a single contacting step, the absorption product will contain an excess amount of sodium carbonate, thereby increasing recycle requirements.

In order to obtain the formed reaction products of this preferred absorption process as a dry flowable powder, the sulfur oxide-containing hot waste gas contacted by the preferred hot aqueous absorbent must be at an initial critical minimum temperature of 90°C, suitably to 800°C for treatment of a smelter off-gas, and preferably between 150° and 230°C. The flue gas from the boiler of older power-plant utility installations is conveniently available within such a preferred temperature range. Where the waste gas is at a higher temperature than 230°C, such as the waste gases from various chemical processing plants, such higher temperature waste gases are readily purified and may serve as a source of recoverable heat.

The following exemplary reactions occur in the absorption step:

$Na_2CO_3 + SO_2 \rightarrow Na_2SO_3 + CO_2$
$Na_2CO_3 + SO_3 \rightarrow Na_2SO_4 + CO_2$
$2NaHCO_3 + SO_2 \rightarrow Na_2SO_3 + H_2O + CO_2$
$2NaHCO_3 + SO_3 \rightarrow Na_2SO_4 + H_2O + CO_2$
$2Na_2SO + O_2 \rightarrow 2Na_2SO_4$ Using a spray-dryer absorption tower, reaction between the sulfur oxides in the flue gas and the sodium carbonate-sodium bicarbonate solution or slurry is extremely rapid. Thus for a 20-ft. absorption tower with a gas velocity of about 25 ft. per second, the resulting residence time of less than a second is sufficient for removal of at least 90% of the sulfur oxides present. At the same time, substantially all the water present is converted to water vapor at well above the dew point of the gas. Most effective contact has been found by spraying the concentrated solution or slurry in cocurrent contact with the flue gas, although countercurrent contacting or mixed contacting may also be utilized. During the course of the reaction, the sulfur dioxide is rapidly absorbed by the sodium bicarbonate-carbonate solution or slurry and converted to sodium sulfite and sodium sulfate. About 10 to 70 wt.% of the formed sodium sulfite is ordinarily oxidized to sodium sulfate. The resultant reaction product is obtained as a dry flowable powder consisting of a mixture of sodium sulfite, sodium sulfate, and sodium carbonate and/or sodium bicarbonate. This resultant product is present in the treated flue gas in a concentration between 0.05 and 10 wt.% solids. It is readily and conveniently removed from the flue gas by using a gas-solid separator such as a cyclone, electrostatic precipitator, or baghouse filter. The desulfurized flue gas, to which the scrubbing step adds about 2 to 10 vol.% water vapor, is discharged to the atmosphere through the power plant exhaust stack.

Where a sulfur oxide-containing flue gas obtained from a power plant burning a fossil fuel is being treated, fly ash in amounts up to 10 wt.% of the flue gas is generally present. It is preferred for economical utilization of the present process, particularly for recovery of sulfur values and regeneration of the absorbent as part of the recycle process, that at least 90% and preferably 99% of the fly ash be removed from the flue gas prior to contacting the flue gas with the aqueous absorbent.

The foregoing preferred absorption process is particularly effective in removing sulfur dioxide from flue gas to form a dry solid which need not require further processing. However, for most applications, it is considered critical from an economic point of view that the sulfur values be recovered and the absorbent be reformed for reuse in the process. While the recovered dry powder from the absorption reaction may be processed at a separate chemical plant, it is particularly preferred to integrate the absorption process as part of a closed-cycle process at the same plant site. By combining the dry-powder-producing aqueous absorption step with a molten salt reduction step followed by an aqueous reformation or regeneration step, a closed-cycle process of enhanced commercial utility is provided.

The solid product removed from the scrubber is sent to a two-stage regenerator. The first stage of the regenerator consists of a reducer where the solid product is treated in the molten state with a reducing agent, preferably with a carbonaceous material such as petroleum coke, to reduce the sodium sulfite and sulfate to sodium sulfide. The sodium carbonate present acts as a solvent for the melt enabling the attainment of the molten state at temperatures as low as 650°C. At the same time, a limited amount of oxygen is added to the reducer to provide for internal heat generation by reaction with the carbonaceous material. For the second stage regeneration, the resulting sodium sulfide-carbonate melt is dissolved in water and reacted with carbon dioxide or a carbon dioxide-yielding material to form hydrogen sulfide and regenerate the sodium carbonate-bicarbonate absorbent. Sodium bicarbonate is illustrative of a carbon dioxide-yielding material which effectively provides carbon dioxide in aqueous solution and can therefore react with the sodium sulfide.

While the principal chemical reactions that occur in the process are all well known in exemplary form, their practical application in the air pollution field has presented various drawbacks which have heretofore hindered their effective commercial utilization. The present closed-cycle process uniquely combines aqueous or solid absorption to obtain a solid product, reaction of the solid product with a reducing agent such as a carbonaceous mterial in the presence of oxygen to provide a molten product, and aqueous reformation of the water-dissolved melt to obtain hydrogen sulfide as a recoverable product and regenerate the absorbent for recycle in the process. Such a recycle process, compared for example with that shown in U.S. Pat. Nos. 3,438,727 and 3,438,728, is of particular interest and utility in removing air pollutants from the flue gases of older utility plants by utilizing existing equipment with minimal modification.

Known aqueous absorption processes may also be utilized for the absorption step in which a waste gas stream containing sulfur dioxide is scrubbed with an aqueous scrubbing solution containing a dissolved alkali whereby sulfur dioxide is absorbed from the waste gas stream into the aqueous solution and forms alkali metal sulfate and sulfite. The solution then requires further processing by evaporation or cooling to recover solid alkali metal sulfite or sulfate. Where required, alkali metal carbonate may be added to the solution or to the recovered solids for subsequent treatment in the regeneration stage.

Also, a solid absorption process may be utilized for the absorption step. Air-borne finely powdered sodium bicarbonate is blown into a sulfur oxide-containing flue gas to form a desired solid powder of sodium sulfate, sodium sulfite and sodium carbonate. However, for effective removal of the sulfur oxides, a relatively long contact time of the reactants is required. For most applications, the required contact times for effective removal are generally not available.

In the particularly preferred absorption process of the present invention, sodium sulfite and sulfate formed in the aqueous scrubbing step are recovered from the scrubber as a dry flowable powder and not in aqueous solution. Sodium carbonate is present with the recovered sodium sulfite and sulfate as a suitable feedstock to the reducer.

It is considered critical for effective and economical reduction of the absorption reaction product that a critical minimal amount of 20 wt.% sulfite-sulfate be present in the feed to the reducer, but not in excess of 85 wt.%, i.e., at least 15 wt.% of sodium carbonate, or a sodium carbonate-yielding material such as sodium bicarbonate, must be present. The presence of at least 15 wt.% sodium carbonate lowers the melting point of the mixture to desired temperatures of about 900°C or lower. When less amounts of sodium carbonate are present, substantially higher temperatures are required in the reducer to maintain the molten state, and this is economically undesirable. In its particularly preferred aspect, the absorption product fed to the reducer consists of a dry flowable powder containing 20–40 wt.% sodium carbonate with the remainder being essentially a mixture of sodium sulfite and sodium sulfate.

BRIEF DESCRIPTION OF THE DRAWINGS

The sole FIGURE of the drawing shows a schematic flow diagram illustrating a preferred embodiment of the closed-cycle process of the invention.

DESCRIPTION OF THE PREFERRED EMBODIMENTS

In the broadest aspects of a preferred embodiment of this invention, any hot waste gas having a sulfur oxide content may be effectively contacted with an aqueous scrubbing medium consisting of a solution or slurry of an alkali metal bicarbonate and/or an alkali metal carbonate, preferably sodium bicarbonate or carbonate, to obtain the reaction product as a dry flowable powder which may be discarded or further processed. Because the purified waste or combustion gas has a low water vapor content, it is readily emitted to the atmosphere at a temperature above its dew point. Thus where purification of the combustion gas by elimination of its sulfur oxide content is the essential desideratum, the present process is of particular utility in this regard whether or not this preferred absorption step is followed by a regeneration step wherein the absorbent is regenerated and sulfur values are recovered.

However, most requirements for an effective and economic process for the elimination of air pollution caused by the emission of sulfur oxides present in waste gases into the atmosphere call for recovery of the removed sulfur content of the gas and regeneration of the absorbent to its original state for recycle in the process. Thus, in its particularly preferred commerical aspects, the process further includes a closed cycle utilizing a two-stage regeneration wherein the formed sodium sulfite and sulfate are reduced with a carbonaceous material in the presence of an oxygen source for heat generation to form a melt of sodium sulfide and sodium carbonate. The melt is dissolved in water and reacted with carbon dioxide to form hydrogen sulfide gas and regenerate the sodium carbonate-bicarbonate absorbent.

It is considered critical in practicing the sequential combination of steps which constitute the closed-cycle process of this invention that following the initial absorption step, the feedstock to the reducer be a solid which contains a minimal amount of 15 wt.% sodium carbonate in order to maintain feasible melt temperatures in the reducer. While this solid feedstock may be derived from any of various aqueous or solid absorption processes, it is particularly preferred that the unique aqueous scrubbing step of this invention directly producing a dry feedstock be utilized to prepare the feed to the reducer. The molten salt reduction product from the reducer is then dissolved in water and reacted in an aqueous reformation step. The present process will therefore be particularly illustrated in its preferred embodiment of an integrated closed-cycle process using an initial spray-drying scrubbing step for the removal of sulfur oxides from hot combustion gases obtained by the burning of sulfur-containing fossil fuels, particularly in electric generating plants.

Absorption

Figure 1:
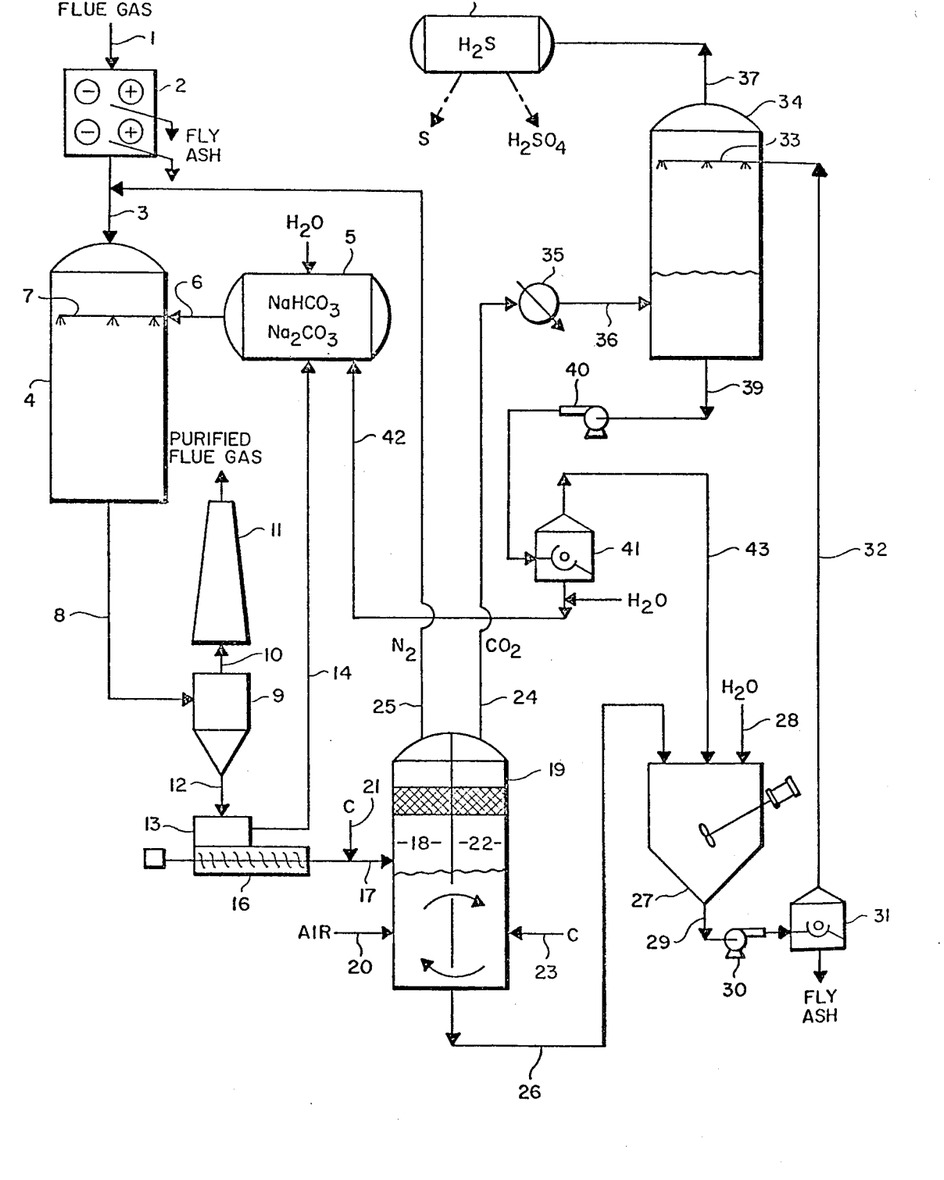

Referring to the drawing, a flue gas obtained from the combustion of a sulfur-containing fossil fuel and at a temperature of about 180°C is admitted by way of a conduit 1 to an electrostatic precipitator 2. For a typical 1,000 Mwe coalfired electric utility plant utilizing a coal containing 3 wt.% sulfur and 10 wt.% ash, about 2 million standard cu. ft./min. flue gas with an $SO_2$ content of about 0.2 vol.% is generated. Such a waste gas stream will also contain a minor portion of sulfur trioxide and about 80 to 100% of the initially present coal ash in the form of finely divided entrained fly ash. At least 90 wt.% and preferably more than 99 wt.% of the fly ash is removed in precipitator 2 prior to feeding the exiting flue gas from the precipitator by way of a conduit 3 to an absorber tower 4. The aqueous scrubbing medium is contained in a storage vessel 5 and preferably consists of a 20 wt.% solution of sodium bicarbonate-sodium carbonate. This is passed by way of a conduit 6 to a spray distributor 7 where the sodium carbonate-bicarbonate in aqueous solution in stoichiometric excess compared with the $SO_2$ removed contacts the flue gas in a cocurrent flow.

Absorber tower 4 serves essentially as a combined spray-dryer and scrubber, providing effective contact and minimal pressure drop in the scrubber. Preferably a directdispersion type stray dryer is used operating on the principle of atomizing a fluid feed to form a spray of droplets which mix with the hot gases. The sensible heat of the flue gas is used to evaporate the liquid and produce a dispersed dry product. Atomization to create the spray or dispersion of droplets is known and may be accomplished by use of centrifugal pressure nozzles, centrifugal disc atomizers, pneumatic atomizers, or impingement atomizers.

The treated flue gas containing the resultant dry product consisting essentially of sodium sulfite, sodium sulfate, and sodium carbonate is passed from absorber 4 by way of a conduit 8 to a cyclone separator unit 9. Because a low ratio of absorbent liquid to flue gas results in efficient reaction, the purified flue gas picks up only a small amount of moisture. The gas is readily removed from cyclone 9 by way of a conduit 10 and discharged to the atmosphere through a stack 11 without occurrence of plume formation. At the same time, the readily flowable dry powder formed is removed from cyclone 9 by way of a conduit 12.

The preferred composition of the resultant powder fed to the reducer consists of about 70 wt.% sodium sulfitesulfate and about 30 wt.% sodium carbonate. Minimal amounts of sodium bicarbonate and water may also be present without interfering with the subsequent reduction reaction. Depending on the $SO_2$ content of the flue gas being treated, the resultant absorption product is optionally recycled from a hopper 13 to absorption tower 4 by way of a side-stream conduit 14, vessel 5, and conduit 6.

Reduction

When the desired composition of the mixture of sodium sulfite-sulfate and sodium carbonate has been obtained, this dry powder mixture is removed from cyclone 9 by way of conduit 12 to hopper 13 of a screw conveyor 16. The dry solid power is then injected by way of a conduit 17 into a combustion or oxidation zone 18 of a two-chamber reducer 19. A controlled amount of an oxygen-containing gas, e.g., air, is injected by way of a conduit 20 into combustion zone 18 at below the melt level in the reducer to generate sufficient heat to maintain the salt in a molten state. By controlling the amount of oxygen added to the oxidation zone, the oxidation reaction can be controlled so as to provide only sufficient heat to sustain the reduction reaction in the molten state. In order to control the reaction occurring in oxidation zone 18 as well as to form a certain amount of sodium sulfide in this zone, it is preferred to admix carbon with the absorption product by way of a conduit 21 prior to injection of the absorption product into reducer 19.

The following intermediate reaction is believed to occur in oxidation zone 18 of the reducer:

This reaction is a highly exothermic one and provides in situ heat generation.

The carbonate-sulfite-sulfate melt flows from oxidation zone 18 to reduction zone 22 of the reducer where a carbonaceous material converts the sodium sulfate and any remaining sodium sulfite to sulfide. The molten sodium carbonate-sodium sulfide is recirculated internally to oxidation zone 18 where sufficient heat is being generated in situ for effecting the reduction reaction in zone 22.

The following over-all exemplary reduction reactions occur in the reducer, principally in reduction zone 22:

Both of these reactions are highly endothermic and require a supply of heat for their maintenance. By performing these reactions in a molten salt state, reactivity is substantially enhanced for both the reduction of sulfate as well as any sulfite present to form sulfide. The sodium carbonate present in the melt lowers the melting point of the mixture so that the mixture is maintained in the liquid phase at feasible temperatures. The reduction reaction is performed at a temperature between 750° C and 1100°C, preferably between 850° and 950°C. Residence times between 5 minutes and 1 hour are suitable for effecting reduction.

Since sodium sulfite can be oxidized to sodium sulfate, and since it is also known to disproportionate to sulfate and sulfide at temperatures above 500°C according to the following equation:

$$4Na_2SO_3 \rightarrow Na_2S + 3Na_2SO_4,$$

ordinarily the principal species undergoing reduction in reducer 19 is sulfate.

Essentially any carbonaceous material providing a source of active carbon may be added below or at the melt level by way of a conduit 23 to reduction zone 22 of reducer 19. Also, other reducing materials not ordinarily considered as a source of active carbon such as natural gas, methane, and carbon monoxide may be utilized. In general the material utilized in the reducer to reduce the sulfate and sulfite will include reducing agents that have low ash contents and that are relatively inexpensive. Such reductants include coke, asphalts, tars, pitches, hydrogen, natural gas, methane, carbon monoxide, petroleum residues, residual fuel oils and the like. The use of fluidized petroleum coke is preferable. Many of these substances ordinarily are heavily contaminated with sulfur-containing materials and are of little or no economic utility. In the present process such materials may be ideally utilized in the reducer, the sulfur contaminants presently actually constituting an asset with respect to later sulfur recovery.

Oxygen may be added in any form which is reactive with the sulfide to form the sulfate. In general air is a preferred form of oxygen for economic reasons.

In addition to feeding oxygen and the carbonaceous material to the reducer, it may be further desirable to include a catalyst to promote the reduction reaction. Iron has been found to be such a catalyst. Thus an amount of iron ranging from about 0.5 to about 7 wt.% of the melt may be used. The iron may be added in an elemental form or in the form of compounds containing iron such as, for example, iron sulfide or iron sulfate.

Where a carbonaceous material providing reactive carbon is used as the reductant, it is preferably added in solid or liquid form. Depending in part upon the particular reductant selected, the reaction parameters (including relative proportions of feedstock and reductant material, temperature, pressure and, solid-liquid, liquid-liquid, or gas-liquid contact conditions) are selected so as to favor the principal reduction reactions and minimize the effects of competing side reactions. However, reaction conditions are selected to optimize the formation of sulfide while at the same time obtaining maximum advantage of the exothermic sulfate formation reaction. Also, since it is desired to remove sulfide and not sulfate from the reducer, the addition of the oxygen source is carefully controlled, and excess carbon is utilized. It is preferred to use about 1.5 times the stoichiometrically required amount of carbon to effect complete reduction. The excess carbon indirectly provides the required amount of heat.

In operating reducer 19, it is also feasible to feed the absorption product from conduit 17 directly to reduction zone 22 along with the carbonaceous material from conduit 23. Essentially the same reduction and oxidation reactions occur in the reducer as above described. By directly feeding the absorption product admixed with carbon to zone 22, sulfite is directly reduced to sulfide with minimal disproportionation to sulfate and sulfide. In general, the reduction of sulfite occurs at a more rapid rate than the reduction of sulfate. However, the heat requirements for melting the mixture and maintaining it in the molten state in zone 22 are increased.

Carbon dioxide is evolved from reduction zone 22 of reducer 19 by way of a conduit 24 for subsequent use in the reformation step. Since air is principally used as the source of oxygen fed to oxidation zone 18, the remaining hot nitrogen gas is evolved from reducer 19 by way of a conduit 25 where it is admixed with the fly ash-free flue gas entering absorber 4 by way of conduit 3. Thereby the heat content of the nitrogen gas is utilized for maintaining high flue gas temperatures. Also, any sulfur compounds present in the nitrogen gas stream are thereby removed in the scrubber.

Reformation

An aqueous process is utilized for the reformation step of the two-stage regeneration. A portion of the molten sodium carbonate-sodium sulfide mixture is drained from reducer 19 by way of a conduit 26 and gravity-fed to a dissolver tank 27. There the melt is contacted with water admitted to the dissolver tank by way of a conduit 28 to form a highly concentrated, essentially saturated aqueous solution of sodium carbonate-sodium sulfide. This solution may also be characterized as consisting of sodium carbonate-sodium hydroxide-sodium bisulfide. The hot aqueous solution is removed from dissolver tank 27 by way of a conduit 29 and a pump 30 and fed to a rotary filter 31 for removal of any residual fly ash or unreacted carbonaceous material. The fly ash-free aqueous saturated solution is then fed from filter 31 by way of a conduit 32 to a spray unit 33 of a regenerator or reformer tower 34.

The hot $CO_2$ gas removed from reducer unit 19 by way of conduit 24 is cooled by passage through a cooler 35 and then fed by way of a conduit 36 to reformer 34. The over-all reaction in the reformer unit is represented by the following exemplary reaction:

$$Na_2S + H_2O + CO_2 \rightarrow Na_2CO_3 + H_2S$$

The hydrogen sulfide gas formed is vacuum-flashed from the system by way of a conduit 37 to a hydrogen sulfide storage tank 38. The sulfur values may be readily recovered from the hydrogen sulfide as elemental sulfur in a conventional Claus plant or as $H_2SO_4$. The bottoms from reformer 34 consisting principally of a sodium carbonate-sodium bicarbonate slurry are removed by way of a conduit 39 and a pump 40 to a filter 41. The filter cake from filter 41 is slurried with water or with a portion of the filtrate from filter 41 and fed by way of a conduit 42 to storage tank 5 for reuse in the process. The remaining filtrate from filter 41 is fed by way of a conduit 43 to dissolver vessel 27. This filtrate consists of a solution containing $Na_2CO_3$, $NaHCO_3$, and unreacted NaHS. Alternatively, if filtration is not required, the bottoms from reformer 34 may be transferred directly to storage tank 5 for reuse in the absorber.

An alternative method of aqueous reformation for converting the sodium sulfide to sodium carbonate and hydrogen sulfide involves utilization of $NaHCO_3$ as a carbon dioxideyielding material. The over-all aqueous reaction may be represented as follows:

$$Na_2S + 2Na_2HCO_3 \rightarrow 2Na_2CO_3 + H_2S$$

The following examples illustrate the practice of the invention but are not intended to unduly limit its generally broad scope.

EXAMPLE 1

Absorption of $SO_2$ by Aqueous Sodium Bicarbonate Slurries

A simulated flue gas was brought to a temperature of about 150°C. Sulfur dioxide was bled into the gas stream until a concentration of approximately 4500 p.p.m. was obtained in the flue gas. An aqueous sodium bicarbonate slurry containing 50 wt.% of absorbent at a temperature of about 80°C was sprayed countercurrently to the flue gas flow at a rate providing about 2.5 times stoichiometric requirements. At residence times of two seconds and velocities of 3.7 ft./sec., more than 97% of the $SO_2$ present was removed.

EXAMPLE 2

Absorption of $SO_2$ by Aqueous Sodium Carbonate and Bicarbonate Slurries

Several series of runs were performed to evaluate requirements for the absorption of $SO_2$ by concentrated aqueous solutions and slurries of sodium bicarbonate and sodium carbonate. The $SO_2$ content of the gas mixture, the gas flow rates, the reaction temperatures, and the stoichiometric ratios of absorbent to $SO_2$ were varied. In all runs, the final product was obtained as a free-flowing powder consisting of a mixture of sodium sulfite, sodium sulfate, and sodium carbonate.

Efficient gas-slurry contact was accomplished in the absorption chamber, effectively a direct dispersion type spray dryer, by atomizing the slurry with a centrifugal sharp edge rotating at 21,000 r.p.m. Alternatively, in some runs the slurry was atomized with a two-fluid nozzle located near the center of the chamber. An $SO_2$-containing waste gas was prepared by adding desired amounts of $SO_2$ to an air stream which was then used as a source of oxygen for firing a natural gas furnace. The resultant waste gas contained the furnace combustion products and was used as the inlet gas stream fed to the absorption chamber. The $SO_2$ content of the inlet gas to the absorption chamber was varied from 400 to 2250 p.p.m. The inlet gas was at a temperature between 120 and 180°C, most of the runs being performed at the higher temperature. Gas flow rates of 970 and 1800 scfm were used, the residence time in the chamber being sufficient to vaporize the water and form a powder which was entrained and carried along by the gas. This powder was separated from the gas in a cyclone collector. The concentration of the absorbent in the aqueous solutions and slurries used varied from 44.5 to 65 wt.% at temperatures varying from about 30° to 80°C. By varying the absorbent feed rate, stoichiometric ratios of absorbent to $SO_2$ ranging from 2.5 to 10 were obtained.

Material balances were determined based on wet chemical analyses and gas chromatographic analyses together with continuous monitoring of the off-gas. Analysis of the data obtained showed $SO_2$ removal efficiencies of at least 90% for the following stoichiometric ratios of absorbent to $SO_2$ at the indicated $SO_2$ concentrations:

1. $NaHCO_3$ ratio of 2.7 or $Na_2CO_3$ ratio of 2.2 at 2,000 p.p.m. $SO_2$.
2. $NaHCO_3$ ratio of 3.4 or $Na_2CO_3$ ratio of 2.9 at 1,000 p.p.m. $SO_2$.

Based on evaluation of the solid-product analytical data, treating dissolved $Na_2CO_3$ as the prime reactant, a 90% $SO_2$ removal efficiency is obtainable with $Na_2CO_3$ ratios as low as 1.2 at 2,000 p.p.m. $SO_2$, 1.6 at 1,000 p.p.m. $SO_2$, and 2.0 at 500 p.p.m. $SO_2$.

EXAMPLE 3

Absorption of $SO_2$ from Flue Gas Using a Modified Spray Dryer

A modified spray dryer of the direct dispersion type with an attached cyclone was installed adjacent to the flue gas duct of an operating coal-fired power plant. A blower was used to pull the flue gas at a temperature of 110°–175°C through the spray dryer at the rate of 1000 to 1400 SCFM. The $SO_2$ concentration in the flue gas was normally in the 200–300 p.p.m. range, and additional $SO_2$ was therefore added in some tests so that a range from 200 to 1500 p.p.m. was covered.

About 100 tests were run, the bulk of which utilized $Na_2CO_3$ solutions ranging from 3 to 32 wt.% as the $SO_2$ absorbent. The absorbent solutions were made by dissolving industrial grade soda ash in water. Industrial grade $NaHCO_3$ was also tested, and the final ten tests utilized an untreated trona-rich ore which has $Na_2CO_3$·$NaHCO_3$·$2H_2O$ as its major constituent. All absorbents tested reacted rapidly and efficiently with the $SO_2$ in the flue gas, a dry product being recovered.

Analysis of the test data indicated that absorbent utilization was best when using the lowest possible concentration of absorbent in the solution. This optimized absorbent concentration also depended on flue gas temperature and $SO_2$ concentration, the temperature determining the amount of water that could be evaporated while still collecting a dry product, and the $SO_2$ concentration determining the amount of absorbent material needed for any given level of $SO_2$ removal. The use of dilute solutions was in contrast to normal spray dryer operation where concentrated solutions or slurries are usually processed in order to minimize water removal requirements and maximize product throughput.

Based on the results of the tests, the following illustrations for optimized operation conditions were derived.

1. Removal of 90% of the 500 p.p.m. $SO_2$ in a 150°C flue gas using 3.0 lb of a 4.9 wt.% $Na_2CO_3$ solution per 1000 standard cubic feet (SCF) of gas.
2. Removal of 95% of the 1000 p.p.m. $SO_2$ in a 180°C flue gas using 4.2 lb of a 7.6 wt.% $Na_2CO_3$ solution per 1000 SCF of gas.
3. Removal of 95% of the 1500 p.p.m. $SO_2$ in a 210°C flue gas using 5.4 lb of a 8.9 wt.% $Na_2CO_3$ solution per 1000 SCF of gas.

The above three derived illustrations are based on demonstrated absorbent utilization of 0.5 lb $SO_2$ removed per 1b $Na_2CO_3$ added. This corresponds to stoichiometric ratios of $Na_2CO_3$ to $SO_2$ in the flue gas of 1.16 for 95% $SO_2$ removal and 1.10 for 90% $SO_2$ removal. It was found that $Na_2CO_3$ utilization was essen-

EXAMPLE 4

Reduction of Sodium Sulfite with Charcoal

One hundred grams of sodium sulfite and 20 grams of finely powdered charcoal were mixed together and placed in an alumina crucible. This was inserted inside of a metal tube which was then capped. The closed tube contained valved conduits for admission of reactant gases and removal of formed gaseous and liquid products.

After a temperature of 800°C was reached, an argon purge gas which had been passed over the surface of the melt was turned off, and air was passed through the melt. A rapid increase in temperature to 950°C indicated an exothermic combustion within the system. The freezing point of the melt was 855°C. Analyses of the melt showed it contained 48 wt.% sodium sulfide.

EXAMPLE 5

Reduction of Sodium Sulfite with Fluidized Coke a. One hundred grams of sodium sulfite and 50 grams of fluidized coke were mixed together and placed in an alumina crucible. This was inserted inside of a metal tube similar to that used in Example 3, and the tube was then capped. Nitrogen was used as the purge gas. After a steady-state temperature of the melt of about 775°C was attained, the nitrogen was turned off and air was bubbled through the melt. Combustion occurred, the temperature within the vessel rising rapidly to 1075°C. Melt samples were removed and analyzed for sulfate and sulfide. The results obtained show that reduction is rapid even in the presence of air, and that sufficient heat to melt the salt can be generated internally by combusting carbon in the melt.

b. One hundred grams of sodium sulfite was mixed with 40 grams of fluidized coke and poured into an alumina container within a quartz outer container. Ten grams of fluidized coke was placed on top of the melt-coke mixture in the alumina container. The quartz container was then capped and a nitrogen purge was started through the mixture. The temperature was increased to 800°C, and air was then bubbled through the melt. A rapid increase in temperature to 862°C occurred. Analysis of the melt showed approximately equal amounts of sodium sulfate and sodium sulfide, with about 4% of sodium sulfite being present.

EXAMPLE 6

Reduction of Sodium Sulfite with Fluidized Coke in Sodium Carbonate Matrix a. Fifty grams of sodium carbonate, 50 grams of sodium sulfite, and 40 grams of fluidized coke were mixed together and placed in an alumina vessel which was then inserted in a metal vessel. An additional 10 grams of fluidized coke was poured on top of the carbonate-sulfite-coke mixture. The temperature of the vessel was gradually increased to 960°C in order to observe both the endothermic and exothermic reactions. When the temperature of the system reached 800°C, an air purge was started. The temperature rose rapidly to 870°C. Observation and analysis of the melt showed that when carbonate is present with the sulfate and coke, the mixture melts at much lower temperatures, about 50° to 100°C lower, than without carbonate and remains molten, thereby permitting reduction to occur at lower temperatures. Approximately 80% of the sodium sulfate present was reduced in about 7 minutes at temperatures of about 800°C.

b. In another run using the same quantities of sodium carbonate, sodium sulfite, and fluidized coke as above, the mixture melted at 760°C. At a temperature of about 875°C air was bubbled through the melt which was maintained about 900°C for 2 hours. Analysis of the melt showed substantial reduction of sodium sulfate to sodium sulfide occurred at temperatures of 900°C.

c. Fifty grams of sodium sulfite, 50 grams of sodium carbonate, and 50 grams of fluidized coke were mixed together and treated as in the two foregoing examples. The temperture was raised, the salt melting at 755°C. When a temperature of 875°C was attained, air was started through the melt and maintained for 20 minutes. The melt was maintained at 905°C with a nitrogen purge for 30 minutes. Analysis of the melt samples showed that sodium sulfate is nearly completely reduced to sodium sulfide in a carbonate flux at 905°C in 30 minutes. When oxygen is excluded from the melt, reduction is essentially complete.

d. Ten grams of fluidized coke, 41.5 grams of sodium sulfite, and 8.5 grams of sodium carbonate were mixed together and placed in an alumina container left open to the air. The amount of coke was about 50% in excess of stoichiometric requirements. After 10 minutes, a temperature of 675°C was reached in the melt, the salt being molten at this temperature. Analysis of the results showed that the amount of sodium carbonate initially present in the mixture is critical in that while melting may be observed initially at relatively low tempertures, as the reaction proceeds the melting point of the resulting mixture increases. Thus sufficient carbonate should be initially present to maintain the mixture in a molten state at 850°C.

Intermediate analysis of the melt showed that no sulfite was present, the melt containing only carbonate, sulfate, and sulfide, 74% of the sulfur being present as sulfide. The final analysis showed that 90% of the sulfur was present as sulfide. This confirmed that sulfate as well as sulfite underwent reduction to sulfide.

e. Ten grams of fluidized coke, 41.5 grams of sodium sulfide, and 8.5 grams of sodium carbonate were mixed together and placed in an open alumina container. The heating curve showed a break in temperature between 600° and 735°C. Samples of the melt were taken at several intervals as the temperature was gradually raised to 900°C. The results showed that carbonate acts as a solubilizing agent, and that carbonate melts containing larger amounts of sulfide and smaller amounts of sulfate have a lower melting point than carbonate melts containing less sulfide and more sulfate.

f. Twenty grams of sodium sulfite, 4 grams of sodium carbonate, and 5 grams of fluidized coke were mixed and poured into an open alumina tube. The tube was then placed in a furnace set at 900°C and the system was heated. Based on thermal analysis, reaction occurred between 650°C and 725°C. As the temperature reached 860°C, the molten salt solidified, but melted again as the temperature was increased. Melt analysis showed 75.5 wt.% sodium sulfide, 0.6 wt.% sodium sulfite, 7.7 wt.% sodium sulfate, and 16.3 wt.% sodium carbonate. A negligible amount of fluidized coke remained in the melt.

EXAMPLE 7

Sodium Carbonate Reformation a. In a small-scale run, 5 grams of anhydrous $Na_2S$ (dried at 140°C in a vacuum oven) was dissolved in 300 ml. water. A $CO_2$ purge at 100 ml./min. was introduced to the solution through a fine sintered-glass frit, and the solution was brought to boiling. After boiling off about 100 ml. of the solution, $H_2S$ was no longer detected in the off-gas. A sample of the solution was taken and evaporated to dryness. The resulting white crystals were dried at 140°C and titrated with normalized HCl to a methyl orange end point. An amount of 93% $Na_2CO_3$ was found in this aliquot. The remaining solution was evaporated to dryness and heated to 250°C to convert any $NaHCO_3$ to $Na_2CO_3$. An amount of 96% $Na_2CO_3$ was found titrimetrically. In both solution aliquots, no $H_2S$ was detected.

b. Pure carbon dioxide and carbon dioxide-helium mixtures were bubbled through aqueous solutions of sodium sulfide. The effluent was monitored by a gas chromatograph to determine the carbon dioxide to hydrogen sulfide ratio.

It was noted that the hydrogen sulfide content of the effluent was a function of the degree of contact between the $CO_2$ and $Na_2S$, the reaction temperature, and teh sodium sulfide concentration of the aqueous solution. Hydrogen sulfide concentrations of up to 40 vol.% were obtained in the effluent, which constitutes a desirable feed material for conversion to elemental sulfur in a Claus plant.

EXAMPLE 8

Regeneration of Absorbent

A dry absorption product collected in a baghouse filter was obtained from the reaction of an air-borne finely powdered sodium bicarbonate absorbent with the sulfur oxides present in a power plant flue gas obtained by burning a high sulfur fuel (1.7% S). About 60% of the $SO_2$ present was removed. Chemical analysis of the absorption product showed that it contained 49% $Na_2SO_4$, 38% $Na_2CO_3$, 1% $NaHCO_3$, 0.8% ash and 0.7% combustible.

About 10 kg of the absorption product was added to a stainless steel reduction vessel. After the material became molten and attained a temperature of about 820°C, 2 kg of fluidized coke was added to the melt to effect the reduction. The melt and coke were mixed in an open vessel exposed to the air and allowed to react for 20–30 min. During mixing, the temperature rose rapidly to 1000°C. After the reduction period, the reduced melt was poured through a screen into a quench and dissolution tank containing water. The material from the quench and dissolution tank was transferred into a regeneration vessel, heated to 100°–110°C and pressurized to 10–12 psig with $CO_2$. At a flow rate of 6–10 cu.ft/hr, $CO_2$ was bubbled through the solution for 12–14 hours. Following the carbonation step the material was flashed into a 20-in. vacuum over a 20–30 min. period to separate the sulfur as $H_2S$ from the bicarbonate. The recovered bottoms consisted mostly of sodium bicarbonate, a chemical analysis of the air-dried product showing 11% $Na_2SO_4$, 3% $Na_2CO_3$, 2% coke and 83% $NaHCO_3$. The recovered product was ground to size and recycled for reuse in absorbing $SO_2$.

The present process is easily retrofitable to older utility power plants, being particularly advantageous for such power plant applications where the temperature of the flue gas to be treated is below 350°C. Thus aqueous alkaline scrubbing solutions may be used in the initial absorption step to scrub the sulfur dioxide-containing flue gas and form sulfite and sulfate in solution. The solution then requires further processing to recover the sulfite and sulfate as a dry powder.

However, the particularly preferred aqueous scrubbing step of the present invention uniquely employs a spray-drying concept to recover the reaction products directly as dry powders. In this preferred process, the exiting flue gas is unsaturated with respect to water, thus eliminating the need for stack gas reheat. By use of a closed cycle using the preferred absorption step, the absorbent is readily regenerated; elemental sulfur or sulfuric acid derived from the hydrogen sulfide is the only by-product, no water-soluble wastes being produced. This results in a significant reduction in tonnage of materials to be removed from the plant site compared with throw-away systems. Also, the flue gas undergoes only a slight drop in pressure and is only moderately cooled during the removal of the sulfur oxides. Thus a significant advantage over other typical wet processes is achieved.

It is also considered feasible for the absorption step to contact the sulfur dioxide-containing flue gas with a stoichiometric excess of dry finely divided sodium bicarbonate to directly form a dry powder of suitable composition as a feed to the reducing stage of the two-stage regenerator. However, such a dry contact process is disadvantageous compared with the preferred aqueous scrubbing absorption step because of the long residence times required in the absorber for the dry contact process to obtain commercially significant removal of the sulfur oxides. Also, during the final regeneration stage, drying of the regenerated absorbent would be required for recycle in such a process.

The present process has been illustrated with respect to the removal of $SO_2$ gas. However, the presence in the flue gas of $SO_3$, which is ordinarily but a minor fraction of the sulfur oxide content, is readily integrated into the operation of the process. Thus, any $SO_3$ gas initially present is converted to sodium sulfate. Since sulfite present in an oxidizing atmosphere is also converted to sulfate, the same treatment for both sulfite and sulfate during the regeneration step is used. In other regenerative aqueous processes, the presence of sulfate often causes difficulty in regeneration efficiency.

While use of the sodium salts as absorbents is generally preferred for economic reasons, for certain applications other alkali metal salts may be used. Thus potassium carbonate and/or bicarbonate offer certain advantages because of their greater solubility in hot aqueous solutions. However, a higher efficiency of recovery is then required during the regeneration stages.

It will of course be realized that many variations in reaction conditions may be used in the practice of this invention, within the limits of the critical parameters set forth, depending upon the particular sulfur oxide content and temperature of the flue gas to be desulfurized, as well as the hydrocarbon or fossil fuel serving as the source of combustion gas. The term "hydrocarbon or fossil fuel" broadly includes carbonaceous fuels such as coal, oil-shade, petroleum products, natural gas, and associated waste products such as acid sludges and tars.

While certain exemplary reactions have been described for the absorption, reduction, and reformation steps, it has been found that the actual mechanism of reaction occuring in these steps is a highly complex one and several competing reactions may occur simultaneously. Thus if the preferred absorption step is conducted in a highly oxidizing atmosphere and at relatively elevated temperatures, the dry powder formed will consist essentially of only sodium carbonate and sodium sulfate, any sulfite formed having been converted to sulfate. Also, the amount of sodium carbonate recovered will depend upon its stoichiometric excess originally present in the preferred aqueous scrubbing medium. Therefore, to optimize these several steps, there will preferably be the usual provision for recycle of various unreacted or partially reacted mixture components. Further, even where the desired reactions do not go to completion, unreacted or undesired products produced by competing or undesired side reactions may be recycled in the process without substantial interference with the basic absorption, reduction and reformation steps. Thus, while the examples illustrating this invention have been described with respect to specific concentrations, times, temperatures, and other reaction conditions, and what is now considered to represent its best embodiment has been illustrated and described, the invention may be otherwise practiced within the scope of the teaching set forth, as will be readily apparent to those skilled in this art. Accordingly, this invention is not to be limited by the illustrative and specific embodiments thereof, but its scope should be determined in accordance with the claims thereof.

We claim:

1. A closed-cycle process capable of removing in a single spray-drying step at least 90% of a sulfur oxide impurity from a hot waste gas comprising the steps of:

contacting the hot sulfur oxide-containing waste gas at a temperature of at least 90°C in a single spray-drying step with an aqueous scrubbing medium containing between 2 and 40 wt.% of an absorbent selected from the group consisting of alkali metal carbonate, alkali metal bicarbonate, and mixtures of alkali metal carbonate and bicarbonate to form alkali metal sufate and sulfite, recovering the resultant reaction product as a flowable, dry powder mixture not requiring further drying, said mixture containing from 20 to 85 wt.% alkali metal sulfite and sulfate and from 15 to 80 wt.% alkali metal carbonate and bicarbonate, reacting said mixture in the molten state with a carbonaceous reducing agent under reducing conditions to convert sulfite and sulfate to sulfide while supplying a controlled amount of a source of gaseous oxygen to the reaction to provide internal heat generation to melt the mixture and maintain it in the molten state.

recovering a molten reaction product of alkali metal sulfide and carbonate, dissolving this reaction product in water to form an aqueous solution, and reacting said aqueous solution with a carbon dioxide-yielding material to form hydrogen sulfide gas as a recoverable product and regenerate alkali metal bicarbonate and carbonate for recirculation in the process.

2. The process of claim 1 wherein said hot waste gas is at a temperature between 150° and 230°C and is spray-contacted by the aqueous scrubbing medium containing between 2 and 40 wt.% sodium carbonate or between 2 and 20 wt.% sodium bicarbonate, or a mixture thereof.

3. The process of claim 1 wherein said hot waste gas is a flue gas produced by burning a sulfur-containing fuel and which contains fuel ash, and at least 90% of said ash is removed from the waste gas prior to contacting it with the scrubbing medium.

4. The process of claim 1 wherein in the reduction reaction said reducing agent is a carbonaceous material selected from carbon black, charcoal, and coke, and the source of oxygen is air.

5. The process of claim 4 wherein carbon dioxide is produced in the reduction reaction and provides said carbon dioxide-yielding material for reaction with said aqueous solution.

6. The process of claim 2 wherein said aqueous scrubbing medium contains 2 to 40 wt.% sodium carbonate.

7. The process of claim 2 wherein said aqueous scrubbing medium contains 2 to 20 wt.% sodium bicarbonate.

* * * * *

UNITED STATES PATENT AND TRADEMARK OFFICE
CERTIFICATE OF CORRECTION

PATENT NO. : 3,932,587
DATED : Jan. 13, 1976
INVENTOR(S) : LeRoy F. Grantham et al It is certified that error appears in the above-identified patent and that said Letters Patent are hereby corrected as shown below:

Column 3, line 6, "3,496,550" should read --2,496,550--.

Column 4, lines 40+, in the second exemplary reaction, "so3" should read --$SO_3$--; in the fifth exemplary reaction, "$2Na_2SO$" should read --$2Na_2SO_3$--.

Column 7, line 66, "directdispersion" should read --direct-dispersion--; "stray" should read --spray--.

Column 8, line 21, "sulfitesulfate" should read --sulfite-sulfate--.

Column 11, line 6, "dioxideyielding" should read --dioxide-yielding--; line 8, that portion of the reaction reading "$2Na_2HCO_3$" should read --$2NaHCO_3$--.

Column 12, line 33, "has" should read --had--.
Column 15, line 27, "teh" should read --the--.

Signed and Sealed this twenty-ninth Day of June 1976

[SEAL]

Attest:

RUTH C. MASON
Attesting Officer

C. MARSHALL DANN
Commissioner of Patents and Trademarks